United States Patent
Uwaji et al.

(10) Patent No.: US 7,323,125 B2
(45) Date of Patent: Jan. 29, 2008

(54) METHOD OF ANALYZING INJECTION MOLDING CONDITIONS

(75) Inventors: Tetsuo Uwaji, Nagoya (JP); Kimio Akazawa, Kobe (JP); Takashi Mizuno, Nagoya (JP); Kenji Tsutsui, Nagoya (JP); Kouji Kuwabara, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 499 days.

(21) Appl. No.: 10/362,736

(22) PCT Filed: Jun. 10, 2002

(86) PCT No.: PCT/JP02/05724

§ 371 (c)(1),
(2), (4) Date: Feb. 6, 2004

(87) PCT Pub. No.: WO02/100623

PCT Pub. Date: Dec. 19, 2002

(65) Prior Publication Data

US 2004/0140579 A1 Jul. 22, 2004

(30) Foreign Application Priority Data

Jun. 8, 2001 (JP) .............................. 2001-173382

(51) Int. Cl.
*B29C 45/77* (2006.01)
*G06G 7/48* (2006.01)

(52) U.S. Cl. .................. 264/40.1; 264/328.1; 700/200; 703/9

(58) Field of Classification Search ............... 264/40.1, 264/40.3, 40.5, 40.6, 328.1; 700/200; 703/7, 703/9

See application file for complete search history.

(56) References Cited

U.S. PATENT DOCUMENTS 6,440,338 B1 * 8/2002 Kamiguchi et al. ........ 264/40.1
6,701,200 B1 * 3/2004 Lukis et al. .................. 700/98

FOREIGN PATENT DOCUMENTS

| JP | 7-214615 | 8/1995 |
| JP | 7-256711 | 10/1995 |
| JP | 8-1744 | 1/1996 |
| JP | 9-272145 | 10/1997 |

(Continued)

*Primary Examiner*—Jill L. Heitbrink
(74) *Attorney, Agent, or Firm*—Oblon, Spivak, McClelland, Maier & Neustadt, P.C.

(57) ABSTRACT

A method for analyzing injection molding conditions, which takes into consideration the compressibility of molten resin in a barrel and mechanical delays in resin flow caused by constituent elements of an injection molding machine and analysis results thereof are provided. In a method for analyzing injection molding conditions in which, by using input data having shape data (31) and injection conditions data (37) to perform flow analysis of the process of filling the inside of the mold with molten resin, analysis of the pressure maintenance process from the filling with molten resin to the gate sealing, and analysis of the cooling process within the mold after gate sealing, the pressure and temperature distributions of resin within the mold are calculated, data (43) regarding compressibility of molten resin held in the barrel of the cylinder and mechanical data caused by constituent elements of the injection molding machine are added to the input data.

20 Claims, 8 Drawing Sheets

FOREIGN PATENT DOCUMENTS

| | | |
|---|---|---|
| JP | 11-232250 | 8/1999 |
| JP | 2000-355033 | 12/2000 |
| JP | 2001-125940 | 5/2001 |
| JP | 2001-312684 | 11/2001 |
| JP | 2002-214107 | 7/2002 |
| WO | 99/01806 | 1/1999 |

\* cited by examiner

METHOD OF ANALYZING INJECTION MOLDING CONDITIONS

FIELD OF THE INVENTION

The present invention relates to a method for analyzing the behavior of molten resin that fills a mold when molding a resin product using an injection molding machine, and to a method of providing results of analysis of injection molding conditions via the Internet.

BACKGROUND ART

Figure 8:
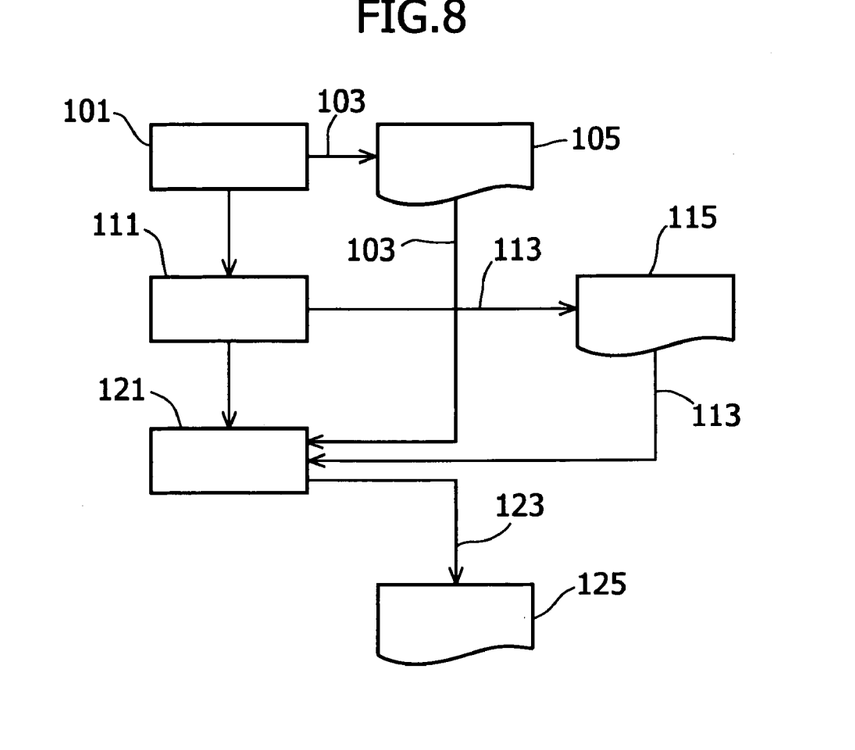
FIG. 8 is a flowchart showing the procedure of the analysis method of the past.

In the past, in the case of molding a product using an injection molding machine, predicted values were determined by simulation, for example by a procedure such as shown in FIG. 8 of the accompanying drawings, and the actual injection of molten resin was done based on these predicted values.

First, when shape data, which is the mold shape and resin object shape is input to the shape data input section 101, this shape data 103 is divided into minute elements so as to be usable in numerical analysis methods such as the finite element method, the boundary element method, and the difference method, and stored in the shape data storage section 105.

Next, when the flow amount and temperature of the filling resin are input to the injection condition data input section 111, the flow amount and temperature data 113 are numerically processed and stored in the data storage section 115.

Additionally, when the above-noted shape data 103 and filling resin flow amount and temperature 113 are input to the mold internal behavior analysis section 121, analysis is performed of the behavior of the molten resin as it fills the mold, analysis of the pressure-maintenance process from completion of filling to gate sealing, and analysis of the cooling process within the mold after gate sealing are performed, and behavior data 123 for behavior of the molding resin within the mold during these analyzed processes is calculated. Of these, the behavior data 123 is stored in the behavior data storage section 125.

In the above-noted prior art, however, only the amount of flow and temperature 113 of the molding resin are input to the injection condition data input section 111, there being no input of the compressibility of the molten resin remaining at the barrel within the cylinder, so that the compressibility of the molten resin that fills this part is not considered in the analysis. Because there is a large amount of molten resin in the barrel, unless the compressibility is considered, there is a risk that the actual injection conditions will be different from the values predicted by the simulation, making it necessary to use an actual machine to perform numerous adjustment and corrections of the predicted values. Additionally, if the compressibility of the molten resin remaining in the barrel changes, it is necessary at that point to again perform adjustment of the predicted values.

Additionally, in the above-noted prior art, there is no input of data with regard to operational delays in such constituent elements of the injection molding machine as motors and screws. Thus, using the simulation method of the past it was difficult to perform an evaluation of the performance of a controller in an injection molding machine having response such that the flow of molten resin filling the mold approaches the target response pattern.

DISCLOSURE OF THE INVENTION

The present invention has an object to provide a method for analyzing injection molding conditions that solves the above-described problems, by considering delay in the resin flow introduced by mechanical aspects of constituent elements of the injection molding machine, so as to better approach actual injection conditions, and a method for providing the results of injection molding conditions via the Internet.

In order to achieve the above-noted object, a method for analyzing injection molding conditions according to the present invention uses input data, which includes mold shape data in which a mold cavity is mathematically defined in response to the shape of a molded resin object, resin path shape data in which a resin path joining an injection apparatus and an injection molding machine is mathematically defined, cavity surface temperature, physical property data of the filling resin, including viscosity, which is temperature dependent, and injection condition data, which includes pressure, temperature, and flow amount of the molten resin at the sprue input part, to perform flow analysis of the process of the molten resin filling the inside of the mold, thereby calculating the flow characteristics in the process of the molten resin filling the inside of the mold, and calculating the flow characteristics of the molten resin flowing into the mold cavity, taking into consideration the injection nozzle path shape and the compressibility of the molten resin remaining at the cylinder barrel. The injection condition data can include such data as the pressure, temperature, and flow amount (or flow rate) of the molten resin at the sprue input. The analysis is performed minimally based on these conditions at the sprue input. The above-noted resin path includes nozzle ends such as sprues, runners, and gates, and parts that join the main part of the mold with the parts corresponding to the objects to be molded.

A screw, capable of moving forward and reverse in the axial direction of the cylinder is provided within the above-noted cylinder, and molten resin is held in a barrel disposed at the forward end of the movement of the screw. When the screw is caused to move forward, molten resin within the barrel is pushed outward, so that molten resin inside the barrel is injected under pressure from the nozzle at the end part of the cylinder, resulting in molten resin being pushed into a cavity of the mold. In this case, if there is a very large amount of molten resin held within the above-noted barrel and pressure is applied, elastic compression occurs, resulting in a time delay between detection of pressure by a load cell provided on a ball screw or the like and the time of the output of the pressure within the mold. In the past, however, the flow analysis simulation was performed under the assumption that the molten resin in the barrel was non-compressible, that is, that it exhibited absolutely no compression when subjected to pressure.

According to the present invention, the compressibility of the molten resin within the barrel is considered in performing flow analysis, thereby enabling the obtaining of behavior data that is more accurate and closer to the actual injection-conditions than was possible in the past. Thus, it is possible to use simulation results as is in performing injection molding, the need to perform numerous corrections of simulation results as was done in the past is eliminated, thereby providing an advantage not only in terms of cost, but also in terms of ease of production.

In a method for analyzing injection molding conditions according to the present invention, data regarding the. compressibility of molten resin held in the above-noted barrel can include at least one of the speed of travel of the screw that pushes the molten resin from the cylinder, the cross-sectional area of the barrel, the cross-section area of the path between the nozzle and the sprue, flow characteristic constants, and the resin compression rate.

According to the present invention, in the above-described analysis method, it is possible to include an additional pressure maintenance step whereby, by calculating the cooling characteristics of the molten resin after completion of the filling of the mold cavity with molten resin, the filling pressure of the molten resin required for correction of volume reduction caused by shrinkage occurring when the resin cools is calculated.

Another aspect of the method for analysis of injection molding conditions according to the present invention is a method for calculating the filling flow amount of molten resin flowing within the nozzle by adding to the above-noted input data the target resin filling flow amount and internal controller parameters, so as to take into consideration the equipment making up the injection molding machine.

An injection molding machine is made up of such apparatuses as motors and ball screws, each of which have so-called play or play allowance. Because this play is inevitable in the case of a rotating machine, it is not possible to eliminate by means of hardware.

Given the above, according to the present invention the delay in the resin flow caused by this mechanical play is incorporated into the flow analysis simulation, so as to enable calculation of more accurate resin behavior data than possible in the past.

Yet another aspect of the method for analysis of injection molding conditions according to the present invention is the method in which the above-noted controller parameters are the gain constants of a PID calculation section of a controller that controls calculation of the speed of travel of the screw. PID control is an automatic control method that determines an operation amount by using the current value of the controlled deviation, and the past integrated and differentiated values thereof.

In a method for analyzing injection molding conditions according to the present invention, an apparatus that makes up the above-noted injection molding machine can be either an electrical motor drive apparatus made up of a screw that pushes molten resin out from within the cylinder, a ball screw that causes the screw to move forward and reverse, and a motor that causes the ball screw to rotate, or a hydraulic drive apparatus which performs direct drive using hydraulic pressure.

Additionally, a method for providing injection molding conditions analysis results according to the present invention is a method having a step of a computer of a data analysis provider accepting an application for analysis of injection molding conditions from a user via a computer, a step of receiving basic injection molding data sent from the user and using the computer of the data analysis provider to perform calculation by the above-noted analysis method, and a step of sending these calculated results and billing information it is stored in a database corresponding to a user identifier to the user via the Internet.

According to the present invention, after a user accesses a webpage of a data analysis provider and performs a prescribed application, by inputting simple base data, it is possible to perform a simulation of injection molding conditions that takes into-consideration the compression ratio of resin in the barrel and mechanical delays.

BEST MODE OF PRACTICING THE INVENTION

Embodiments of the present invention are described below in detail, with references made to relevant accompanying drawings.

[Configuration of an Injection Molding Machine]

Figure 1:
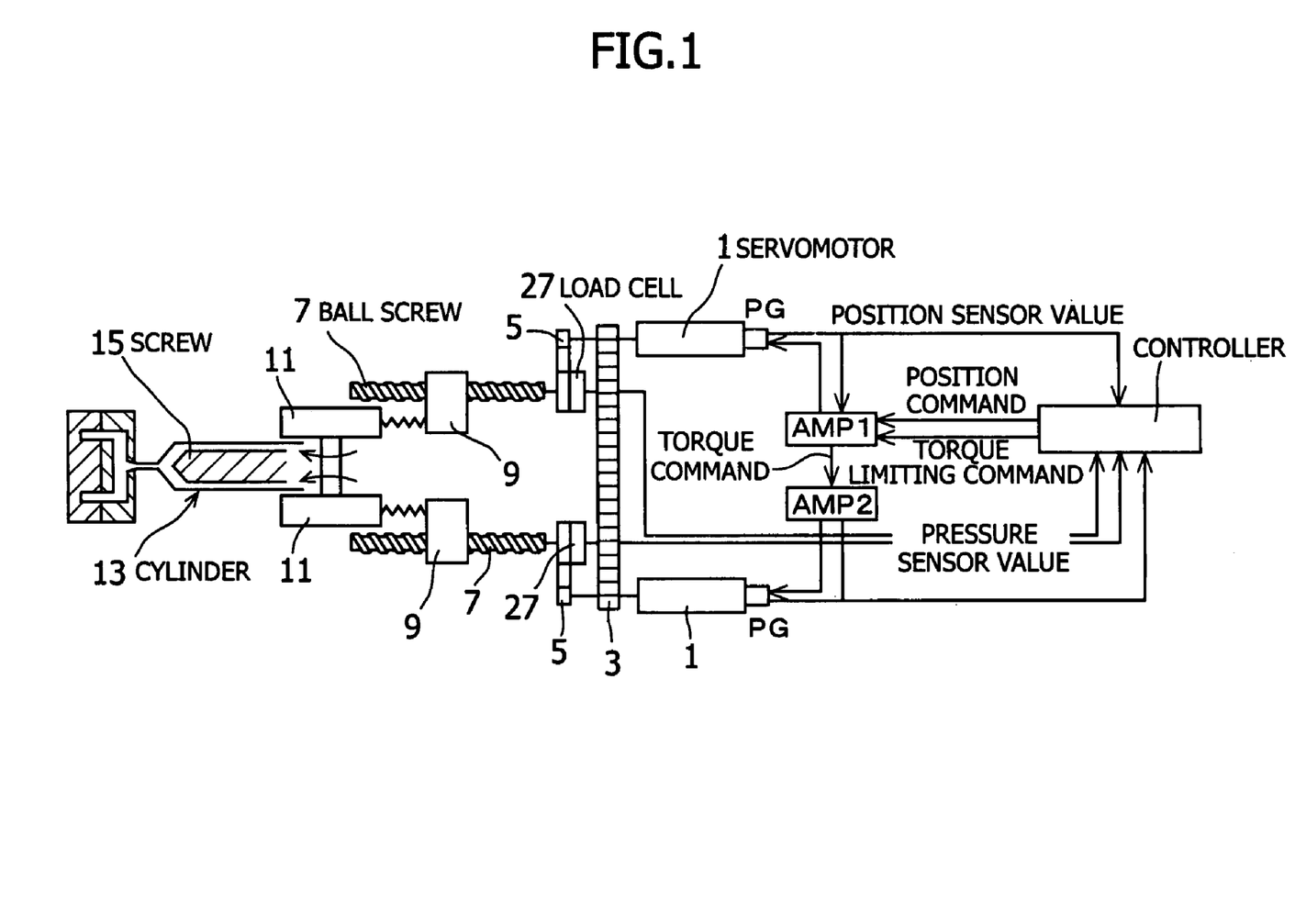
FIG. 1 is a simplified drawing showing an injection molding machine using an embodiment of the present invention.

FIG. 1 is a simplified drawing of an injection-molding machine used in an embodiment of the present invention.

At the rear of the injection molding machine are disposed rotatable servomotors 1, 1 at the top and bottom, these motors being linked by a synchronizing belt 3. The ends of servomotors 1, 1 are linked by timing belts 5, 5 to ball screws 7, 7. Ball nuts 9, 9 are screwed onto the ball screws 7, 7. The ball nuts 9, 9 are connected to the base part of a screw 15 within a cylinder 13, via pusher plates 11, 11, and are rotatably supported.

Figure 2:
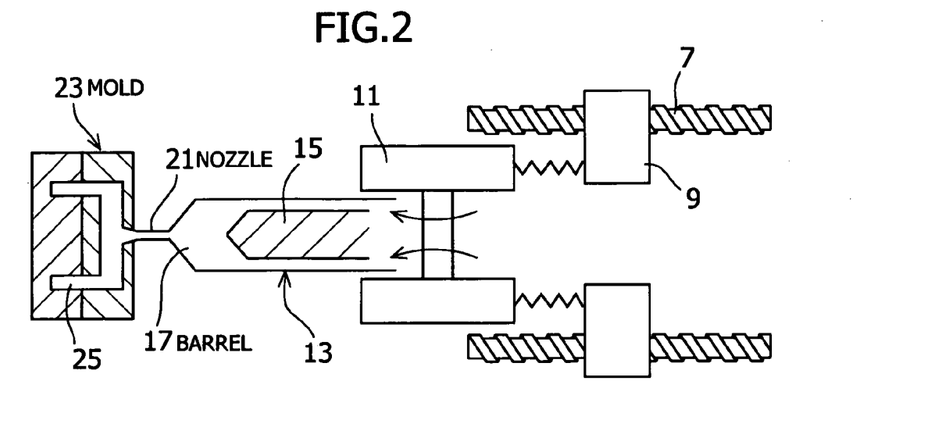
FIG. 2 is a magnified cross-sectional view showing the main part of FIG. 1.

As shown in FIG. 2, within the reversible cylinder 13, as noted above, a screw 15, which is movable forward and reverse, is disposed, the front part of the screw 15 having formed on it a resin receptacle known as a barrel 17. Additionally, at the end part of the cylinder 13 is formed a nozzle 21, the sprue, runner, and gate being connected in that sequence to the mold 23. Inside the mold 23 is formed a cavity having a shape that matches the product shape, the parting surfaces of which can be opened and closed.

The operating condition of an injection molding machine configured as noted above is as follows. The cylinder 13 is fixed to a base (not shown in the drawing), the pusher plates 11 are driver forward and reverse on the-base via a linear drive mechanism formed by the ball screws 7 an the nuts 9. The screw 15 is rotatably supported by the pusher plates 11 and is driven so that it can rotate and move forward and reverse within the cylinder 13.

The injection molding process is described next from the start of continuous operation.

At the end of injection, at the reversible step, the screw 15 is at the forward-most position relative to the cylinder 13. A rotational drive mechanism (not shown in the drawing) causes the screw 15 to rotate, so that the solid resin supplied to the base of the screw is feed along the screw groove. The resin at this point is subjected to friction between the inner cylinder wall and the screw groove surface so as to be heated. Because the cylinder 13 is heated by an external heater, the resin within the cylinder 13 receives both the heat of friction and the external heat and gradually melts with the operation of the feed along the lead of the screw groove. The molten resin is accumulated in the barrel 17. As molten resin accumulates in the barrel 17, the screw moves in reverse. When the amount of accumulated molten resin reaches a prescribed amount, the rotation of the screw is stopped, and the injection phase is entered.

When performing injection molding, the servomotors 1, 1 are driven, the ball screws 7,7 rotate, the ball nuts 9,9 screwed onto the ball screws 7.7 and the pusher plates 11, 11 move forward in the leftward direction of FIG. 1, in accordance with which motion the screw 15 also moves forward, so that the molten resin held within the cylinder 13 is injected into the cavity 25, the molten resin pressure at this time being detected by a load cell 27 (refer to FIG. 1).

Although the above is for the case of a ball screw type linear drive mechanism, it will be understood that this can be replaced by a hydraulically driven mechanism. An example of a hydraulically driven mechanism is noted in Japanese unexamined patent application publication H10-109339.

FIRST EMBODIMENT

Figure 3:
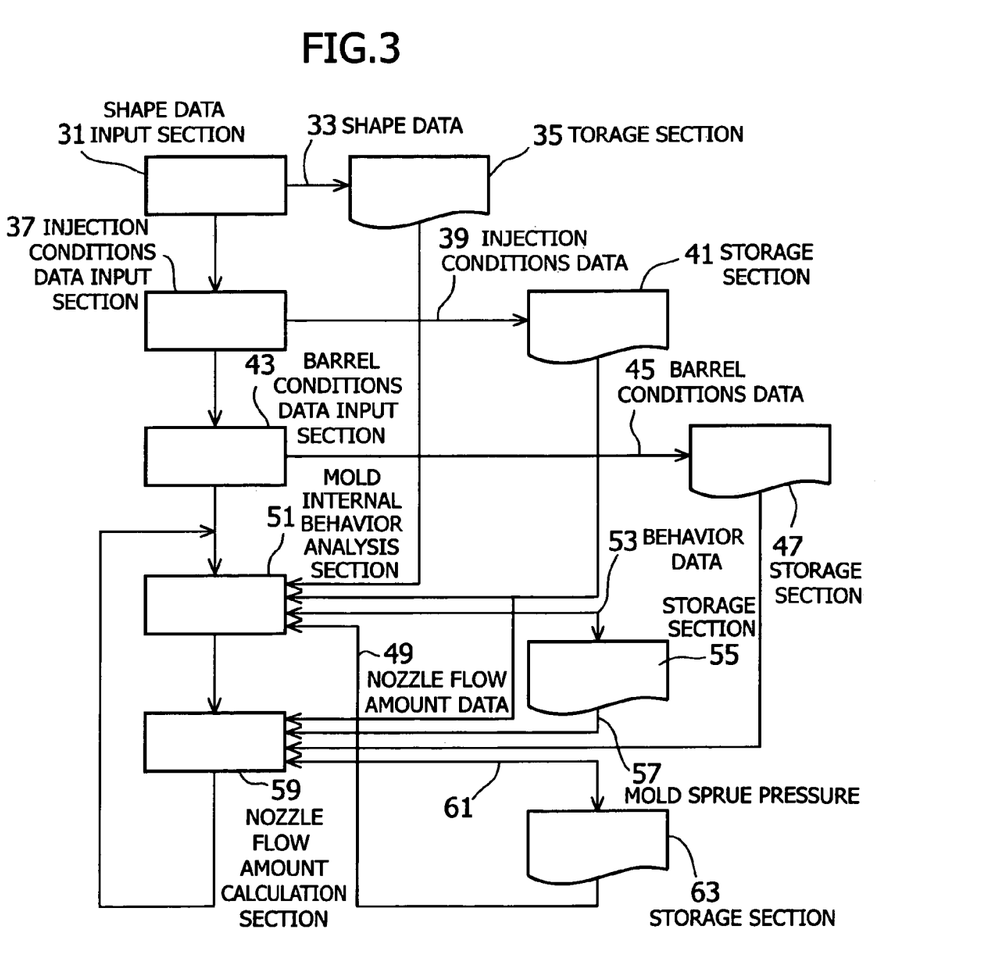
FIG. 3 is a flowchart showing the procedure of an analysis method according to a first embodiment of the present invention.

As the first embodiment, an analysis procedure which takes into consideration the compression ratio of molten resin in the barrel 17 when the inside of the mold 23 is filled with molten resin is described below.

(1) Input of Shape Data

First, when data regarding the shape of the mold and the shape of the molded resin product (hereinafter referred to as shape data) is input to a shape data input section 31 of a computer, this input shape data 23 is divided into minute elements so as to be usable in numerical analysis methods such as the finite element method, the boundary element method, and the difference method, and stored in the shape data storage section 35.

(2) Input of Injection Condition Data

Next, when the filling resin physical property data, flow amount and temperature of the filling resin, and time response data of the travel speed of the screw (hereinafter referred to as injection condition data) are input to the injection condition data input section 37, these data 39 are numerically processed and stored in the data storage section 41. The above-noted physical property data minimally includes a number of thermal properties such as the resin melted density, specific heat, and thermal conductivity coefficient, and the viscosity when molten. The injection condition data 39 is effect in establishing the conditions for injection, pressure maintenance, and cooling.

(3) Input of Barrel Conditions

Additionally, when the barrel cross-sectional area and length, the nozzle diameter and length, the sprue diameter and length, the resin viscosity and resin compression ratio (hereinafter referred to as the barrel conditions data) are input to the barrel conditions data input section 43, the barrel conditions data 45 is subjected to numerical processing such as units conversion suitable for calculations to be described below, and is stored in the barrel conditions data storage section 47.

(4) Analysis of Molding Resin Behavior Within the Mold

After the above, when the shape data 33, the injection condition data 39, and nozzle flow amount data 49 stored in the storage section for nozzle flow amount and the like, to be described below, are input to a mold internal behavior analysis section 51, analysis of the flow of molten resin being filled into the mold, analysis of the pressure maintenance process from the end of filling until the gate sequence, and analysis of the cooling process within the mode after the gate sealing are performed, and behavior data 53 for behavior of the molding resin within the mold during these analyzed processes is calculated. The behavior data 53 is stored in the internal mold behavior data storage section 55.

(5) Calculation of Nozzle Flow Amount and the Like

When the barrel conditions data 45 stored in the barrel conditions storage section 47, the injection conditions data 36 stored in the injection conditions data storage section 41, and the nozzle pressure inside the mold 57 of the behavior data stored in the internal mold behavior data storage section 55 are input to the calculation section 59, at this calculation section data 61, such as the volume of molten resin in the barrel 17, the pressure of the molten resin in the barrel 17, and the nozzle flow amount are calculated and stored in the storage section 63 for nozzle flow amount and the like.

The volume $V_B$ of molten resin in the barrel 17 is calculated by the following equation.

$$dV_B/dt = -A_B \cdot v_s \quad \text{(Equation 1)}$$

In the above, $V_B$ is the volume of molten resin in the barrel, $A_B$ is the cross-sectional area of the barrel, and $v_s$ is the screw velocity.

The pressure $P_B$ of the molten resin in the barrel 17 is calculated by the following equation.

$$V_B \cdot \beta \cdot dP_B/dt = -A_B \cdot v_s - Q \quad \text{(Equation 2)}$$

In the above, $P_B$ is the pressure of molten resin in the barrel, Q is the amount of flow of nozzle resin, and $\beta$ is the compression ratio of the resin.

The resin amount of flow Q at the nozzle is calculated by the following equation.

$$Q = [(P_B - P_C)/A_r]^{1/n} \quad \text{(Equation 3)}$$

In the above, $P_C$ is the pressure at the input of the mold sprue, $A_r$ is the cross-sectional area of the nozzle, and n is a constant related to the flow characteristics.

By rearranging the above, we have the following.

(a) Relationship Obtaining Within the Mold Cavity After the Sprue $$P_C = f_1(\eta, \beta, Q, 1) \quad \text{(Equation 4)}$$

(b) Nozzle Relationship $$P_B - P_C = f_2(\eta, Q) \quad \text{(Equation 5)}$$

(c) Barrel Relationship $$V_B \cdot \beta \cdot dP_B/dt = -A_B \cdot v_s - Q \quad \text{(Equation 6)}$$

$$dV_B/dt = A_B \cdot v_s \quad \text{(Equation 7)}$$

(d) Relationship Established by Screw Drive Conditions $$v_s = f_3(t) \quad \text{(Equation 8)}$$

In the above, $P_B$ is the nozzle input pressure.

$P_C$ is the sprue input pressure (equal to the nozzle output pressure), and this can also be thought of as the mold filling pressure. $f_1$ and $f_2$ are characteristics functions, and $f_3$ is a function that expresses the relationship between the injection speed, which is obtained as a control result relative to an injection speed control value, and a control system parameter. $f_1$, $f_2$, and $f_3$ can be determined either theoretically or by experimental data. In the present invention, of these functions, $f_2(t)$ in particular is dependent upon the resin compression ratio $\beta$.

Analysis by using Equation 4 alone is the part that indicates overall flow analysis in the proposed prior art, which uses numerical analysis methods such as the finite element method, the boundary element method, or the FAN method or the like.

Figure 9:
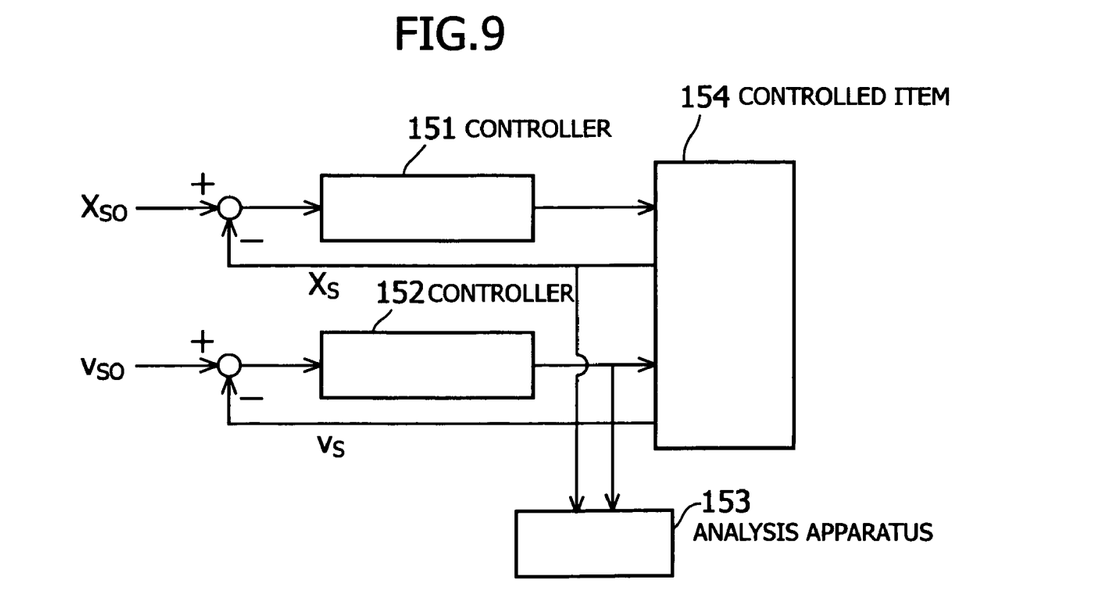
FIG. 9 is a diagram showing the control system used in the present invention.

In contrast to this, in the present invention Q or $v_s$ is given beforehand, and $v_s{}^*A_B$ is obtained, with analysis being performed by Equation 6 and the like. Additionally, in the present invention it is possible to use $v_s$ to determine the drive system characteristics. For example, it is possible to determine $v_s$, that is to determine $f_3(t)$ in correspondence to the injection screw speed, the injection screw drive-apparatus speed, the injection screw ball screw rotational drive motor speed, or a sensor signal or control signal value related to the drive condition of a linear drive hydraulic system of the injection screw. As shown in FIG. 9, a speed command signal corresponding to a signal command value is given, and the controllers 151, 151 are used to control the controlled item 154, this being a motor driven or hydraulic driven apparatus. That is, $X_s$ and $v_s$ are output from the controllers 151, 151 respectively. $v_s$ is output from the analysis apparatus 153 and analyzed.

SECOND EMBODIMENT

The first embodiment is the case in which analysis is performed of the simultaneous Equations 4 through 8.

Figure 4:
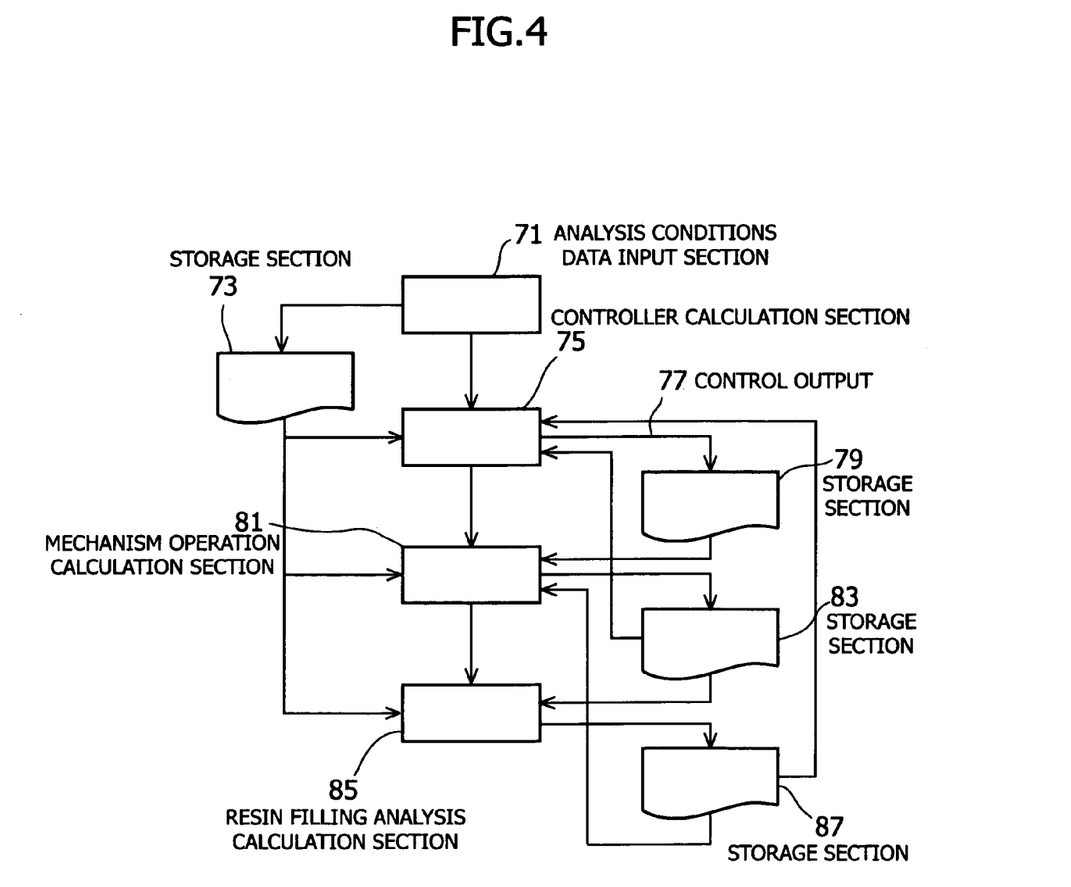
FIG. 4 is a flowchart showing the procedure of an analysis method according to a second embodiment of the present invention.

As a second embodiment, an analysis procedure in which, when injecting molten resin in the mold 23 so as to fill the mold, consideration is given to both the compression ratio of molten resin in the barrel 17 and mechanical delays attributed to mechanical constituent elements of the injection molding machine is described below, with reference made to FIG. 4.

(1) Input of Analysis Conditions Data

First, the target pattern of flow of the filling resin, parameters within the controller, input parameters to the mechanism operation calculation section described below, and shape data (shape of the mold and shape of the resin molded product) are subjected to numerical-processing such as units conversion for suitability to calculations described below, and the shape data is divided into minute elements suitable for a numerical analysis method such as the finite element method, the boundary element method, or the difference method or the like, input to the analysis conditions data input section 72, and stored in the analysis conditions data storage section 73.

The above-noted mechanism operation calculation section indicates the part that performs a calculation of the operations of the an amplifier, a motor 1, a load cell 27, a ball screw 7, and a screw 15.

(2) Input to the Controller Calculation Section

Next, when the target pattern of filling resin and the controller internal parameters stored in the above-noted analysis conditions data storage section 73, the motor position stored in the mechanical operation storage section, and the nozzle resin flow amount and mold internal resin pressure stored in the resin filling analysis calculation storage section are input to the controller calculation section 75, the position command and torque limiting command, which are the control outputs 77 are calculated and stored in the controller output storage section 79.

The method of calculation in the controller calculation section 75 is a calculation method which reduces the difference between the resin flow target pattern and the nozzle resin flow amount calculated by the resin filling analysis calculation section (so-called accustomizing control), or a known control calculation method such as PID control or adaptive control having the same purpose as accustomizing control.

(3) Input to the Mechanism Operation Calculation Section

Additionally, when the filling resin target parameters and controller internal parameters stored in the analysis conditions data storage section 73, the position command and torque limiting command stored in the controller output storage section 79, and the barrel resin pressure stored in the resin filling analysis calculation value storage section are input to the mechanism operation calculation section 81, the screw speed and motor position and the like are calculated and stored in the mechanism operation calculation value storage section 83.

In the mechanism operation calculation section, calculation is performed by a calculation method to solve the Newtonian equations for linear motion and for rotational motion.

(4) Resin Filing Analysis Section

Next, when the mold shape and resin molded product shape stored in the analysis conditions data storage section 73 and screw speed stored in the mechanism operation calculation storage section 83 are input to the resin filling analysis calculation section 85, the mold internal resin pressure, nozzle resin flow amount, and barrel resin pressure and the like are calculated and stored in the resin filling analysis calculation value storage section 87. These calculations are performed using the same calculation method as in (5) Calculation of Nozzle Flow Amount and the Like described with regard to the first embodiment.

The calculations performed in this case refer to the calculation by numerical analysis by Equation 5 or from the nozzle input up until the gate.

That is, this corresponds to the case of performing numerical calculation processing of Equation 5 without regard to Equation 3.

Figure 5:
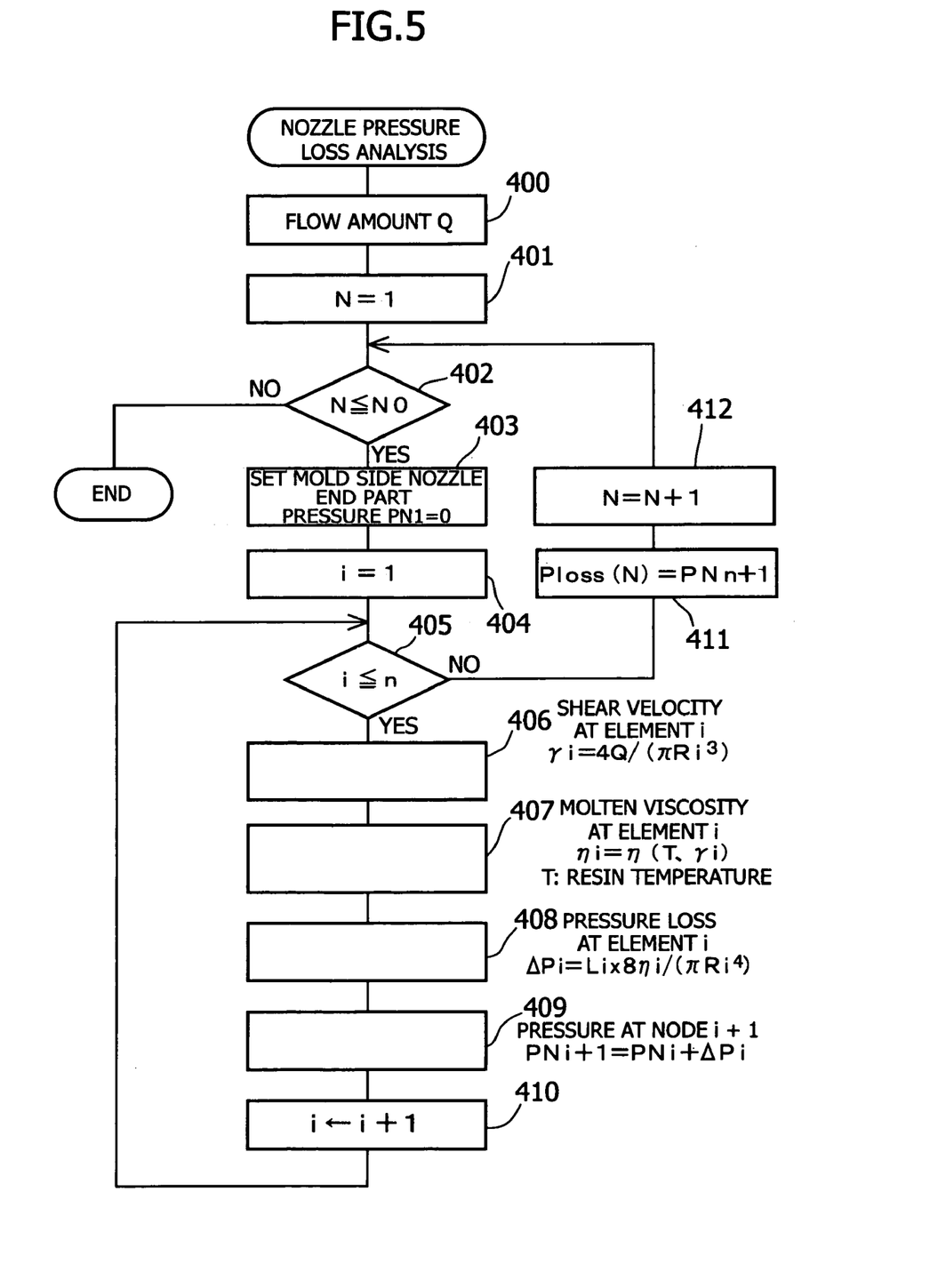
FIG. 5 is a flowchart showing a pressure loss analysis at nozzle in the second embodiment of the present invention.

Next, using FIG. 5, the flow of pressure loss analysis for pressure loss at the nozzle relative to the nozzle shape modeled using first order elements in n divisions is described below.

First, at step 400 the nozzle resin flow amount Q determined by the above-noted Equation 3 is calculated using the injection speed data V ($V_0$) used in the flow analysis.

At step 401, the counter N, which represents discrete time information taken at a sampling period is set to 1, and the accumulated resin pressure loss $PN_1$ at the nozzle on the mold side is set to 9 (step 403).

At step 404, the counter i for the element number within the nozzle shape model is set to 1, and the shear velocity $\gamma_i$ at the i-th element is determined by Equation 9 within the round pipe (step 405).

$$\gamma_i = 4Q/(\pi R_i{}^3) \quad \text{(Equation 9)}$$

In the above, $R_i$ is the radius at the i-th element.

Next, at step 406 the molten viscosity $\eta_i$ within the element i is calculated from the resin temperature T (this resin temperature being determined by empirically predicting the set nozzle temperature, for example by adding 10 degrees to the nozzle temperature setting) and the shear velocity $\gamma_i$, for example using the following viscosity modeling equation 10.

$$\eta_i = A \times \gamma_i{}^B \times \mathrm{Exp}\,(C \times T) \quad \text{(Equation 10)}$$

In the above A, B, and C are constants. At step 408 the pressure loss $\Delta P_i$ in the element i is determined from the flow pressure loss within a round pipe indicated by Equation 6, and the accumulated pressure loss $PN_{i+1}$ at node i+1 is determined by adding $\Delta P_i$ to the pressure loss at node i of $PN_i$ (step 409).

$$\Delta P_i = L_i \times Q \times 8\eta_i/(\pi R_i 4) \tag{Equation 6}$$

In the above, $L_i$ is the length of the i-th element, $R_i$ is the radius of the i-th element, and $\eta_i$ is the molten viscosity at the i-th element, these being input beforehand. Next, taking the next element as i+1 (step 410), return is made to step 405, from which steps 406 to 410 are executed until i exceeds n, the thus determined accumulated pressure loss at the molding machine nozzle end node $PN_{n+1}$ being stored as $P_{loss}(N)$.

At step 412, the counter N is incremented by 1, and steps 402 to 412 are repeated until the counter value N reaches the number of data N0 of the resin pressure data at the resin input obtained by the resin flow analysis, thereby calculating the pressure loss curve $P_{loss}(N)$.

Figure 6:
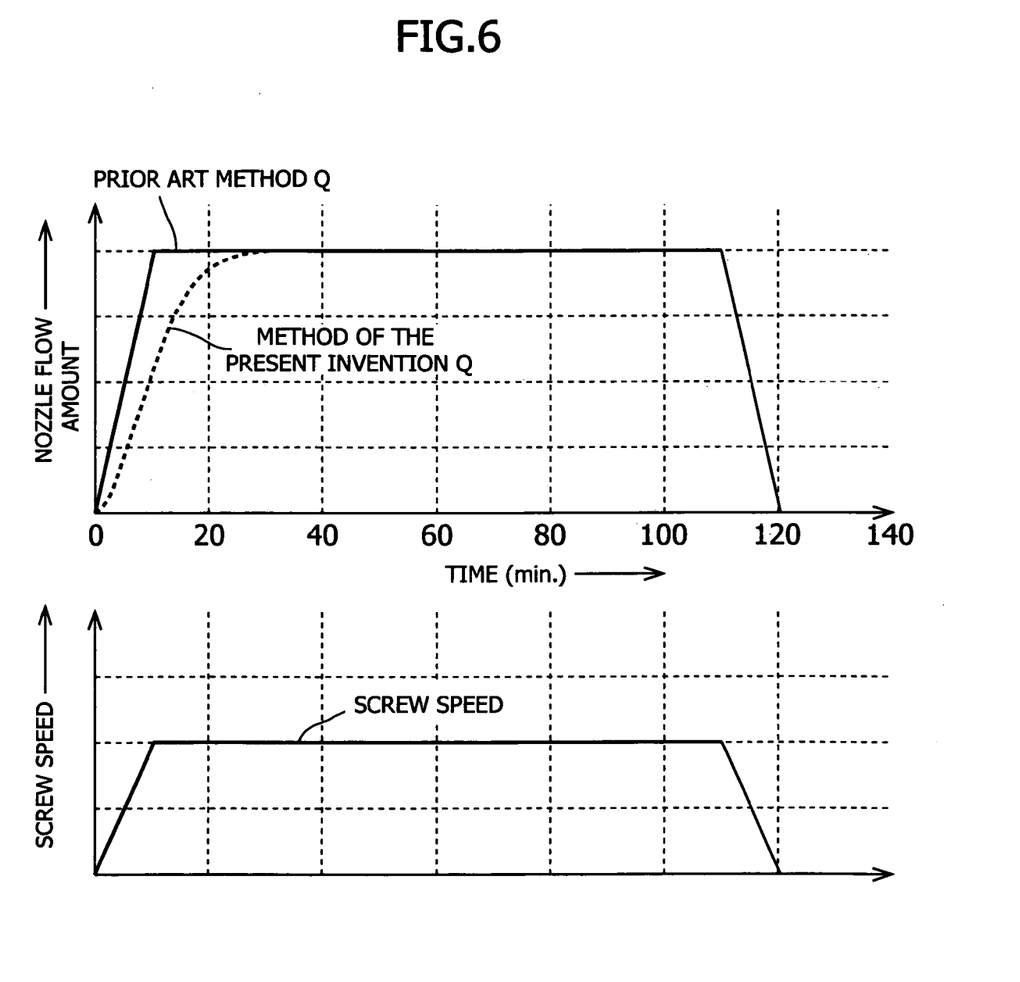
FIG. 6 is a graph showing simulation results in the second embodiment of the present invention.

The nozzle flow amount of molten resin in the second embodiment is shown in FIG. 6. FIG. 6 shows a graph of the analysis of the nozzle flow amount according to the prior art in comparison with the nozzle flow amount at the same screw speed according to the second embodiment.

As can be seen from FIG. 6, the present invention clearly provides a clearer indication of the time delay in the nozzle flow amount, which is shown on a smooth curve. In particular, immediately after the start of filling, because there is a large flow of resin in the barrel, the shrinkage amount due to compression is large, so that there is a great difference compared with the past, this having an influence, as a difference in filling amount, extending up until the end of filling.

The effect of the injection molding conditions analysis methods described above is described next.

According to the first embodiment, by performing analysis calculation by treating the molten resin from the barrel until inside the mold as one, the compressibility of the resin in the barrel is taken into consideration, thereby enabling consideration to be given to the delay in resin flow relative to the movement of the screw, enabling highly accurate calculation of the resin pressure within the mold when performing high-speed filling, and filling behavior such as the nozzle resin flow amount.

Furthermore, the compressibility of the resin in all parts of the barrel, the nozzle, and the mold are treated by one and the same program, thereby enabling calculation of the pressure distribution and temperature distribution throughout the nozzle and within the mold.

Additionally, taking the resin flow amount as an injection condition, regardless of whether the finite element method, the boundary element method, or the difference method or the like is used as the method for calculating the pressure and temperature distributions, or whether the division order thereof is second or third order, it is possible to use this method.

According to the second embodiment, by inputting the parameters that are input to the controller and the target resin filling flow amount pattern, it is possible to calculate the characteristic values of the nozzle resin flow amount with the passage of time, taking into consideration both the electrical or mechanical delays introduced by such elements as motors and screws making up the injection molding machine, and the delay in response caused by resin compressibility in the barrel.

By feeding back the resin pressure in the barrel to the controller, it is possible to calculate the position command value, which is the control output, taking into consideration the compressibility of resin.

Additionally, when a control parameter change is made, when a parameter of a device making up the drive part of the injection molding machine is changed, or when the mold shape is changed, it is possible to perform a quality evaluation of the molded object by a single calculation, which takes into consideration mechanical delay and delay caused by barrel resin compressibility.

The present invention is not restricted to the above-described embodiments, and can take a variety of forms and be variously changed, based on the technical concept of the present invention.

For example, although in the first embodiment the mold internal behavior analysis section 51 and the nozzle flow amount calculation section 59 are separated for separated input and calculation, it is possible to join these in performing the calculation. In almost any method of analyzing the mold internal behavior of molding resin, internally higher-order simultaneous equations are solved internally, and by solving those simultaneously with equations 1 to 3, it is possible to perform an integrated calculation in the mold internal behavior analysis section 51 and the nozzle flow amount calculation section 59.

Figure 7:
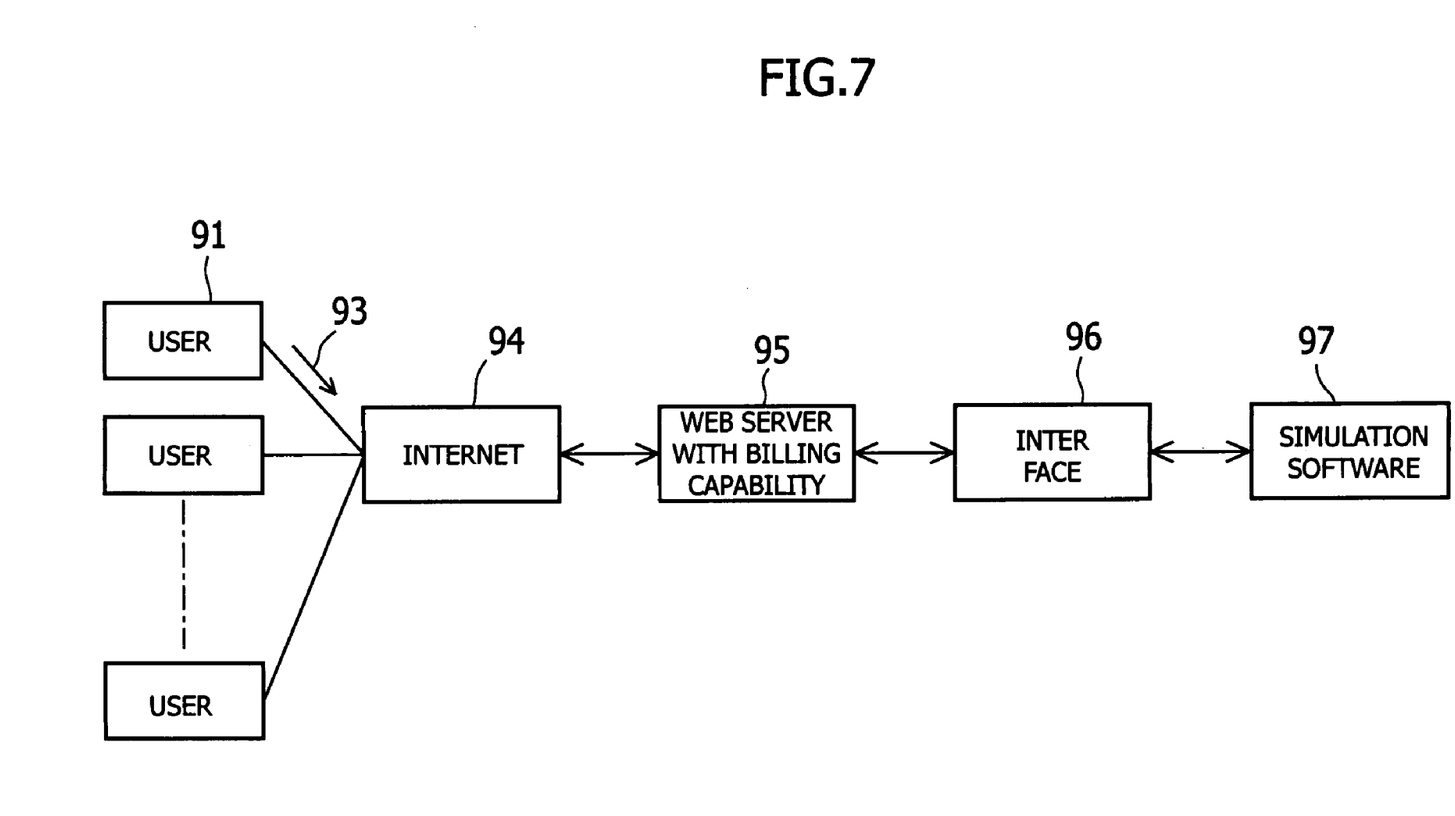
FIG. 7 is a conceptual drawing of a system that enables a third party to use the analysis simulation of the present invention via the Internet.

It is further possible to enable a third part to use the analysis method of the present invention via the Internet. For example, as shown in FIG. 7, a user 91 who has registered as a user sends to a web server 95 having a billing capability a product purchase request 93, which has a user identifier and a request that indicates the requested service, via the Internet 84. Next, it is possible to access simulation software 97 (the analysis simulation of the present invention) on a web page of the data provider via the Internet. When the user 91 inputs basic data, the above-noted simulation software calculates the nozzle resin flow amount, taking into consideration the pressure distribution and temperature distribution of resin inside the mold, as well as the compressibility of the molten resin in the barrel and mechanical delays, sending the calculation results and billing information related thereto to the user 91. The billing information is also stored in a database in correspondence with the user identifier.

The invention claimed is:

1. A method for analyzing injection molding conditions using input data which includes:

mold shape data in which a mold cavity is mathematically defined in response to a shape of a molded resin object, resin path shape data in which a resin path joining an injection apparatus and an injection molding machine is mathematically defined, cavity surface temperature, physical property data of the filling resin, including viscosity, which is temperature dependent, and injection data which includes pressure, temperature, and flow amount of the molten resin filling the inside of the mold, the method comprising:

inputting mold shape data regarding a shape of the mold and a shape of a molded resin product into a computer;

inputting resin path shape data in which a resin path joining an injection apparatus and an injection molding machine is mathematically defined into the computer;

inputting injection data including the flow amount to fill the mold, temperature of the resin, physical data of the resin including viscosity, and data relating to a travel speed of an input screw into the computer;

inputting barrel data including barrel cross-sectional area and length, nozzle diameter and length, sprue diameter and length, and resin compression ratio into the computer;

calculating flow characteristics including
- volume of molten resin in the barrel in the process of the molten resin filling the inside of the mold,
- the pressure of molten resin in the barrel, and
- the amount of flow at the nozzle, based on the input data; and calculating the flow characteristics of the molten resin flowing into the mold cavity, while taking into consideration the injection nozzle path shape and a compressibility of the molten resin in the cylinder barrel.

2. A method for analyzing injection molding conditions according to claim 1, further comprising a pressure maintenance step whereby, by calculating a cooling characteristic of the molten resin after completion of the filling of the mold cavity with molten resin, the filling pressure of the molten resin required for correction of volume reduction caused by shrinkage occurring when the resin cools is calculated.

3. A method for analyzing injection molding conditions according to claim 1, whereby the flow amount at a sprue input part in the injection conditions data is an amount of flow uniquely determined relative to an injection screw speed or speed signal.

4. A method for analyzing injection molding conditions according to claim 1, wherein the speed or speed signal of the injection screw is a speed or speed signal controlled by a speed controller of a drive apparatus that linearly drives the injection screw.

5. A method for analyzing injection molding conditions according to claim 1, wherein the linear drive apparatus is a motor drive apparatus having a ball screw and a motor that rotationally drives the ball screw.

6. A method for analyzing injection molding conditions according to claim 4, wherein the linear drive apparatus is a hydraulic drive apparatus.

7. A method for providing analysis results, comprising:
- a data provider computer accepting an analysis request for injection conditions;
- receiving basic injection molding data;
- performing calculation, using an analysis method recited in any one of claim 1 to claim 6; and
- sending the result of the calculation and billing information regarding a cost of performing the calculation stored in a database in correspondence to an identifier of the user via the Internet to the user as a bill for performing the calculation.

8. A method for analyzing injection molding conditions according to claim 2, whereby the flow amount at a sprue input part in the injection conditions data is an amount of flow uniquely determined relative to an injection screw speed or speed signal.

9. A method for analyzing injection molding conditions according to claim 2, wherein the speed or speed signal of the injection screw is a speed or speed signal controlled by a speed controller of a drive apparatus that linearly drives the injection screw.

10. A method for analyzing injection molding conditions according to claim 3, wherein the speed or speed signal of the injection screw is a speed or speed signal controlled by a speed controller of a drive apparatus that linearly drives the injection screw.

11. A method for analyzing injection molding conditions according to claim 8, wherein the speed or speed signal of the injection screw is a speed or speed signal controlled by a speed controller of a drive apparatus that linearly drives the injection screw.

12. A method for analyzing injection molding conditions according to claim 2, wherein the linear drive apparatus is a motor drive apparatus having a ball screw and a motor that rotationally drives the ball screw.

13. A method for analyzing injection molding conditions according to claim 3, wherein the linear drive apparatus is a motor drive apparatus having a ball screw and a motor that rotationally drives the ball screw.

14. A method for analyzing injection molding conditions according to claim 4, wherein the linear drive apparatus is a motor drive apparatus having a ball screw and a motor that rotationally drives the ball screw.

15. A method for analyzing injection molding conditions according to claim 8, wherein the linear drive apparatus is a hydraulic drive apparatus.

16. A method for analyzing injection molding conditions according to claim 9, wherein the linear drive apparatus is a hydraulic drive apparatus.

17. A method for analyzing injection molding conditions according to claim 10, wherein the linear drive apparatus is a hydraulic drive apparatus.

18. A method for analyzing injection molding conditions according to claim 11, wherein the linear drive apparatus is a hydraulic drive apparatus.

19. A method for analyzing injection molding conditions according to claim 12, wherein the linear drive apparatus is a hydraulic drive apparatus.

20. A method for analyzing injection molding conditions according to claim 13, wherein the linear drive apparatus is a hydraulic drive apparatus.

* * * * *